(12) United States Patent
Lee et al.

(10) Patent No.: US 8,949,707 B2
(45) Date of Patent: Feb. 3, 2015

(54) ADAPTIVE DOCUMENT DISPLAYING APPARATUS AND METHOD

(75) Inventors: Hye-Jeong Lee, Seoul (KR); Ji-Hye Chung, Seoul (KR); Jong-Ho Lea, Seongnam-si (KR); Yeun-Bae Kim, Seongnam-si (KR); Byung-In Yoo, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 637 days.

(21) Appl. No.: 12/219,936

(22) Filed: Jul. 30, 2008

(65) Prior Publication Data

US 2009/0106653 A1 Apr. 23, 2009

(30) Foreign Application Priority Data

Oct. 23, 2007 (KR) ........................ 10-2007-0106847

(51) Int. Cl.
*G06F 3/00* (2006.01)
*G06F 17/21* (2006.01)

(52) U.S. Cl.
CPC ................................. *G06F 17/211* (2013.01)
USPC ........................................................ 715/234

(58) Field of Classification Search
USPC .................................... 715/234, 243, 254
See application file for complete search history.

(56) References Cited

U.S. PATENT DOCUMENTS

| 7,069,506 | B2 * | 6/2006 | Rosenholtz et al. | 715/273 |
| 2002/0078090 | A1 * | 6/2002 | Hwang et al. | 707/513 |
| 2004/0064475 | A1 * | 4/2004 | Maeda et al. | 707/103 Y |
| 2004/0205627 | A1 | 10/2004 | Rosenholtz et al. | |
| 2006/0123042 | A1 * | 6/2006 | Xie et al. | 707/102 |
| 2007/0162845 | A1 * | 7/2007 | Cave et al. | 715/530 |
| 2007/0232292 | A1 * | 10/2007 | Larocca | 455/425 |
| 2008/0195575 | A1 * | 8/2008 | Schiffler | 707/1 |
| 2008/0300872 | A1 * | 12/2008 | Basu et al. | 704/235 |
| 2009/0063264 | A1 * | 3/2009 | Leung | 705/14 |
| 2009/0199230 | A1 * | 8/2009 | Kumar et al. | 725/32 |

FOREIGN PATENT DOCUMENTS

| JP | 2002-117019 | 4/2002 | |
| KR | 10-2002-0006722 | 1/2002 | |
| KR | 10-2004-0038458 | 5/2004 | |
| KR | 10-2005-0027172 | 3/2005 | |
| KR | 10-2006-0107285 | 10/2006 | |
| WO | WO 2006/081835 | * 8/2006 | G06F 17/30 |

OTHER PUBLICATIONS

Cai et al., "VIPS: a Vision-based Page Segmentation Algorithm," Nov. 1, 2003, Microsoft Research, pp. 1-29.*
Ogden et al., "Document thumbnail visualizations for rapid relevance judgements: When do they pay off?" New Mexico State University, 1998, pp. 1-7.*
Korean Office Action dated May 30, 2014 from Korean Patent Application No. 10-2007-0106847.
Korean Office Action dated Oct. 31, 2013 from Korean Patent Application Publication No. 10-2007-0106847.

* cited by examiner

*Primary Examiner* — Kyle Stork
(74) *Attorney, Agent, or Firm* — Staas & Halsey LLP

(57) ABSTRACT

Provided are an adaptive document display apparatus and method, and more particularly, an adaptive document displaying apparatus and method which can adaptively convert a document according to the screen size of a device that is to display the document. The adaptive document displaying apparatus includes: a document analyzing unit analyzing each of a plurality of components included in a document; and a document converting unit converting the document according to the result of analysis and attributes of a display device.

10 Claims, 10 Drawing Sheets

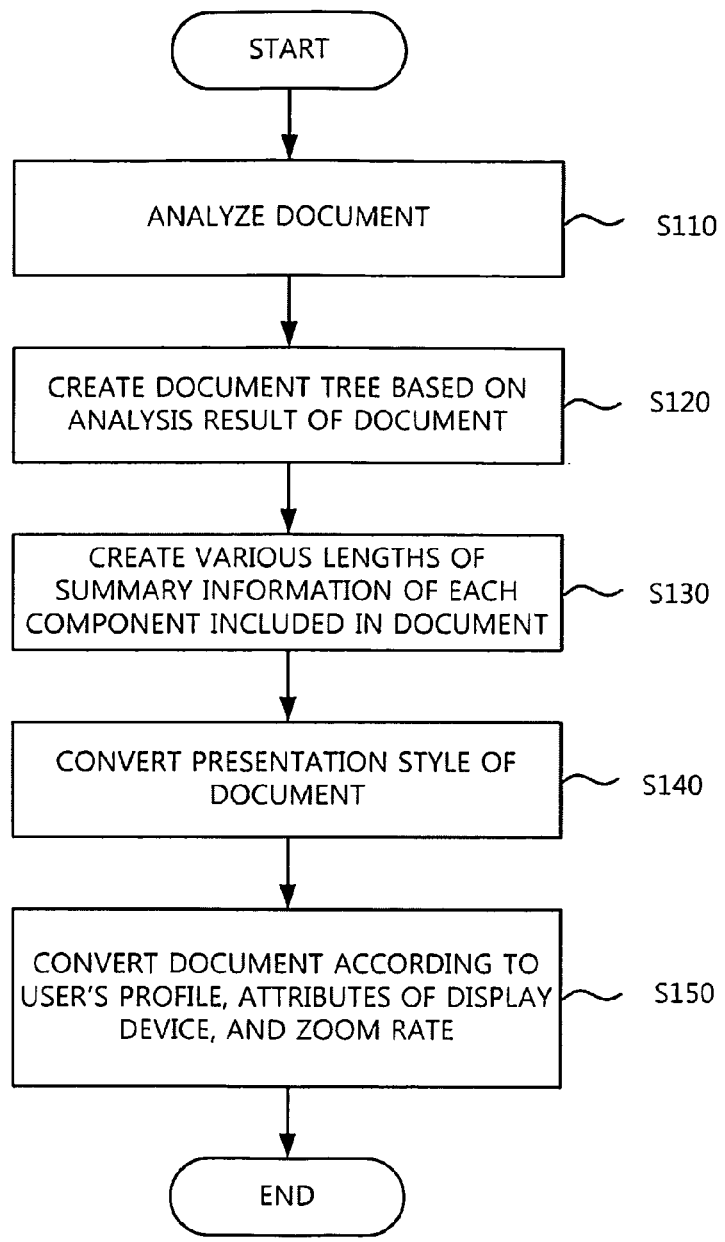

ADAPTIVE DOCUMENT DISPLAYING APPARATUS AND METHOD

CROSS-REFERENCE TO RELATED APPLICATION

This application claims priority from Korean Patent Application No. 10-2007-0106847 filed on Oct. 23, 2007 in the Korean Intellectual Property Office, the disclosure of which is incorporated herein by reference in its entirety.

BACKGROUND OF THE INVENTION

1. Field of the Invention

The present invention relates to an adaptive document display apparatus and method, and more particularly, to an adaptive document displaying apparatus and method which can adaptively convert a document according to the screen size of a device that is to display the document.

2. Description of the Related Art Since most of Internet contents are created for a personal computer (PC) environment, there exist various problems when the Internet contents are used in a television (TV) environment. For example, while the screen size of a TV is larger than that of a PC, the viewing distance (for example, 2.5 m) between a user and the TV may be almost ten times greater than the viewing distance (for example, 30 cm) between the user and the PC.

Therefore, the screen size of the TV perceived by the user is smaller than that of the PC. For this reason, when the user views Internet contents on the TV, the readability of the Internet contents deteriorates. Generally, users remain passive when watching TV. That is, the users hardly manipulate a TV while watching entertaining contents on the TV. However, when the users use the TV to search for desired information, they are required to take active attitudes which are contradictory to their usual attitudes toward the TV.

In order to address the problem of deterioration of readability due to a longer viewing distance between a user and a TV than that between the user and a PC, a zoomable interface may be provided to enable the user to enlarge a web page and view the enlarged web page. Using the zoomable interface, the user can enlarge all or part of the web page or the font size of text and view the enlarged web page or text.

When the entire web page is enlarged, the user may be able to view all contents of the enlarged web page. However, since the entire web page is enlarged, it is difficult to identify the entire layout of the web page on one screen. In addition, the user has to scroll through the web page or reduce the web page through a zoom-out action in order to view unseen contents. Furthermore, when the web page is enlarged to an enlargement rate greater than a predetermined enlargement rate, it is difficult to view images and text on one screen.

When part of the web page is enlarged, it is difficult to display certain contents in the TV environment. In addition, since desired information cannot be easily found in the full-screen state with reduced readability, various regions of the web page must be enlarged.

In this regard, a method of converting a web page according to attributes of a device, which is to display the web page, and a user's profile in order to enable the user to easily find desired information is required.

SUMMARY OF THE INVENTION

Aspects of the present invention provide an adaptive document displaying apparatus and method which can adjust the layout of a document and the amount of contents to be displayed according to a user's profile and attributes of a device that is to display the document.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an adaptive document displaying apparatus including: a document analyzing unit analyzing each of a plurality of components included in a document; and a document converting unit converting the document according to the result of analysis and attributes of a display device.

According to another aspect of the present invention, there is provided an adaptive document displaying method including: analyzing each of a plurality of components included in a document; and converting the document according to the result of analysis and attributes of a display device.

BRIEF DESCRIPTION OF THE DRAWINGS

The above and other aspects and features of the present invention will become more apparent by describing in detail exemplary embodiments thereof with reference to the attached drawings, in which:

FIG. 10 is a flowchart illustrating an adaptive document displaying method according to an exemplary embodiment of the present invention.

DETAILED DESCRIPTION OF THE INVENTION

Figure 1:
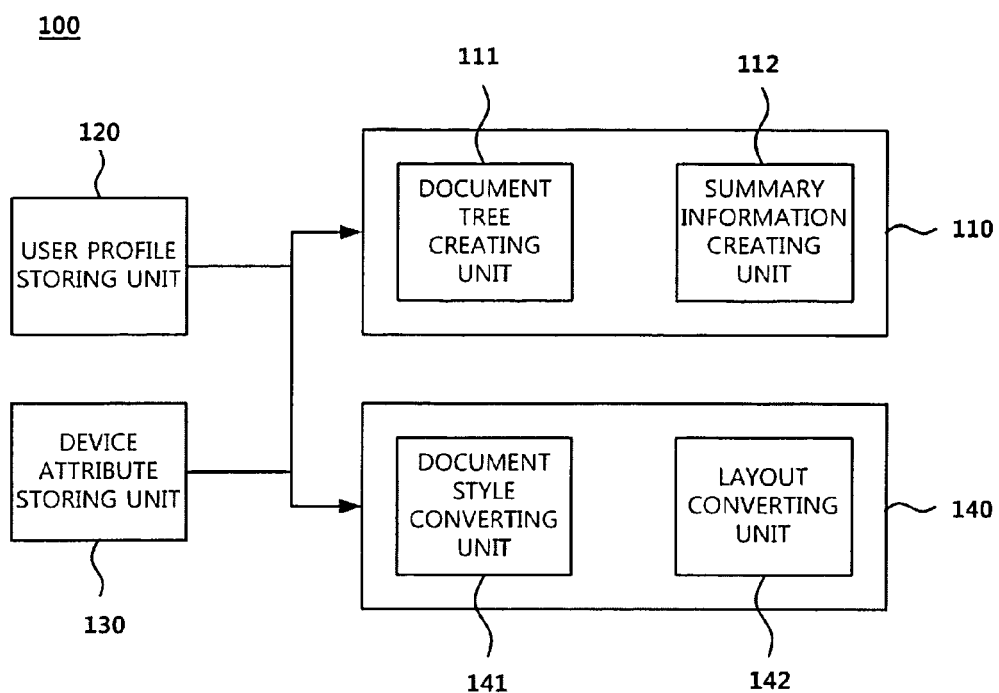
FIG. 1 is a block diagram of an adaptive document displaying apparatus according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram of an adaptive document displaying apparatus 100 according to an exemplary embodiment of the present invention.

Referring to FIG. 1, the adaptive document displaying apparatus 100 includes a document analyzing unit 110, which analyzes documents, a user profile storing unit 120, which stores information regarding user preferences, a device attribute storing unit 130, which stores attributes of devices (hereinafter, referred to as "display devices") that display documents, and a document converting unit 140 which converts each document based on the analysis result of the document and according to a user's profile and attributes of a display device.

Documents according to exemplary embodiments of the present invention refer to web pages. However, web pages are merely an example used to promote the understanding of the present invention, and the present invention is not limited thereto. That is, the documents according to the exemplary embodiments of the present invention may include those written in markup languages such as hypertext markup language (HTML) and extensible markup language (XML).

In addition, documents which are analyzed by the document analyzing unit 110 may have been created not for the type of display devices used in the present invention, but for types of display devices. For example, documents which are analyzed by the document analyzing unit 110 may be those created for personal computers (PCs), and a display device used in the present invention may be a television (TV).

In the exemplary embodiments of the present invention, a user's profile may be understood as contents and a layout preferred by the user. In addition, attributes of a display device may be understood as the screen size and resolution of the display device. However, the present invention is not limited thereto.

The document analyzing unit 110 may include a document tree creating unit 111 and a summary information creating unit 112. The document tree creating unit 111 may analyze each of a plurality of components included in a document and create a document tree. The summary information creating unit 112 may create summary information of each analyzed component.

Specifically, the document tree creating unit 111 may analyze a document which includes a plurality of components, creates a hierarchy of the components based on the result of analysis, and creates a document tree which represents the hierarchical relationships between the components. In this case, each component corresponds to a node of the document tree. For example, if a document is a web page, the document may include first through third components. The first component is the lowest element of the document and is distinguished by its single media format and presentation style. Examples of the first component include text, an image, a video, a button and an input window. The second component includes a plurality of first components having the equal importance. The third component is the entire web page and includes a plurality of second components. A plurality of third components may form a website.

The second component may also include a plurality of second components as well as a plurality of first components. That is, when a plurality of second components, each of which includes a plurality of first components having the equal importance, have the equal importance, they may form another second component. Thus, the document tree creating unit 111 creates a document tree so that a document can be analyzed as first through third components. That is, the document tree creating unit 111 analyzes the document in terms of a tree structure so that the document converting unit 120 can convert the document.

Figure 2:
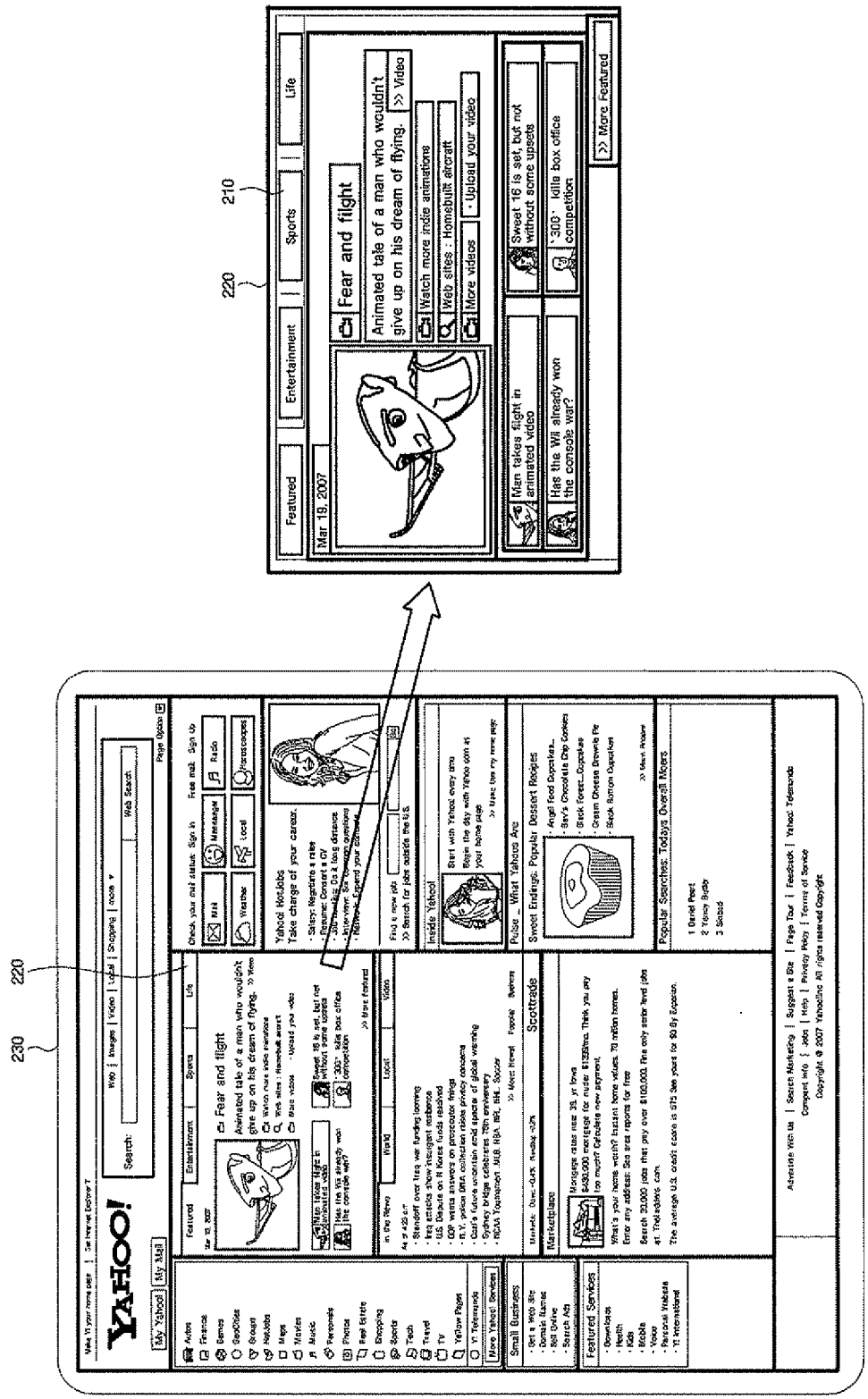
FIG. 2 is a schematic diagram of a document including a plurality of components according to an exemplary embodiment of the present invention.

FIG. 2 is a schematic diagram of a document including first through third components 210 through 230 according to an exemplary embodiment of the present invention.

Referring to FIG. 2, the document includes the third component 230, which is the document itself, the second components 220 included in the third component 230, and the first components 210 included in each of the second components 220. In FIG. 2, only one of the second components 220 is shown as an example to promote the understanding of the present invention. However, components indicated by bold lines in the third component 230 may be understood as the second components 220. Similarly, components indicated by bold lines in the second component 220 shown in FIG. 2 may be understood as the first components 210.

Figure 3:
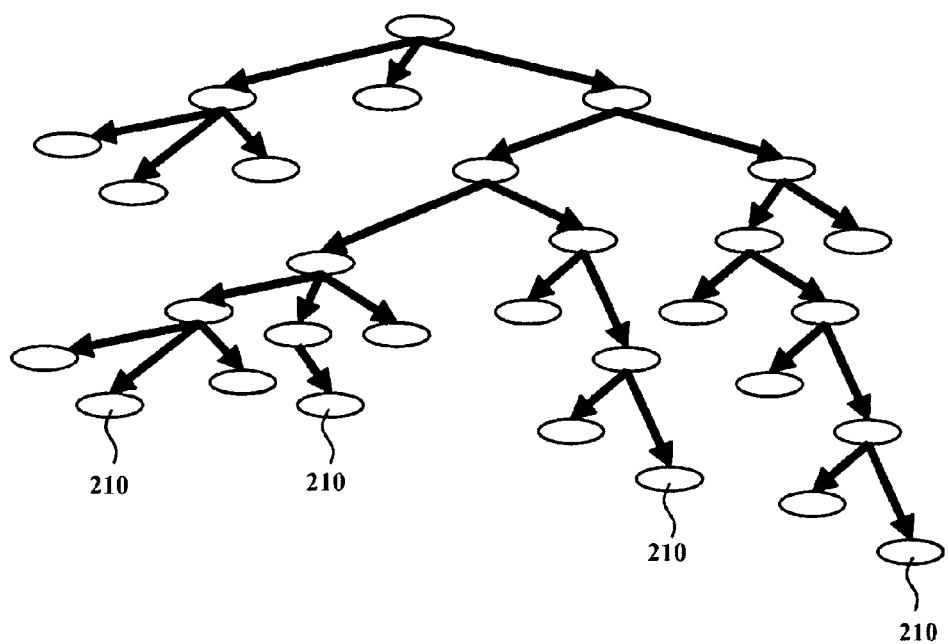
FIG. 3 is a schematic diagram of a basic tree of an analyzed document according to an exemplary embodiment of the present invention.
Figure 4:
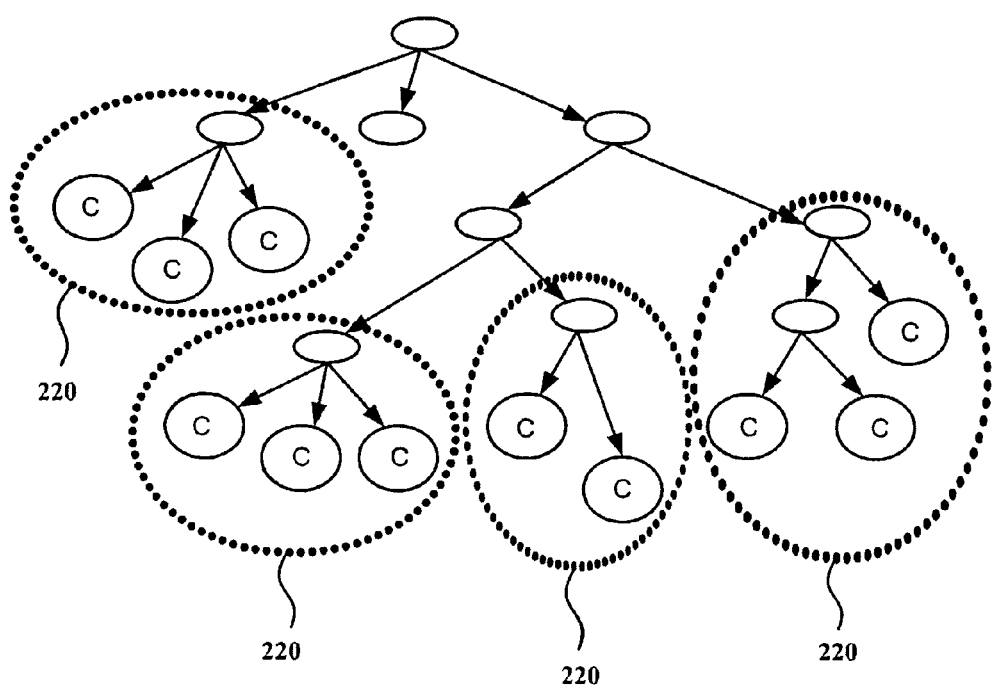
FIG. 4 is a schematic diagram showing first and second components according to an exemplary embodiment of the present invention.
Figure 5:
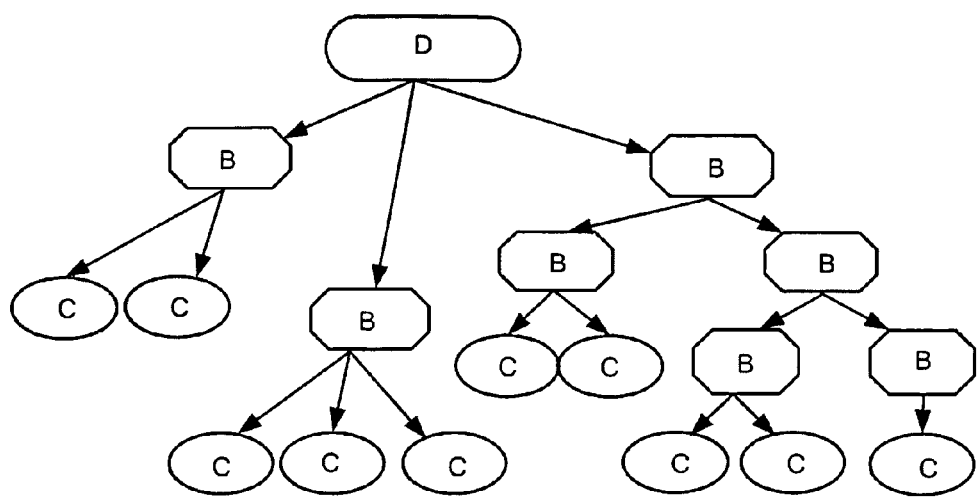
FIG. 5 is a schematic diagram of a document tree according to an exemplary embodiment of the present invention.

The document tree creating unit 111 analyzes the document and creates a basic tree, that is, a document object model (DOM) tree, as shown in FIG. 3. Referring to FIG. 3, the first components 210 correspond to leaf nodes of the created basic tree, respectively, according to media formats and presentation styles. In addition, the first components 210 having the equal significance form each of the second components 220 as shown in FIG. 4. The third component 230 corresponds to a roof node of the created basic tree. Consequently, a document tree shown in FIG. 5 may be created. In FIG. 4, reference character "C" indicates a first component. In addition, in FIG.

5, reference character "C" indicates a first component, reference character "B" indicates a second component, and reference character "D" indicates a third component.

The document tree creating unit 111 may assign attributes, such as layout, presentation style and content format, of each component to a corresponding node of a document tree.

The layout of a component may include the position of the component, the size of the component, margin, alignment, layout arrangement, and layout pattern. In this case, the position of the component is related to the arrangement of components and represented by x and y coordinates. In addition, the size of the component is represented by width and height, and examples of the layout arrangement include header, left, center, right and footer. The presentation style of a component may include font type, font size, color, background, and boarder.

Figure 6:
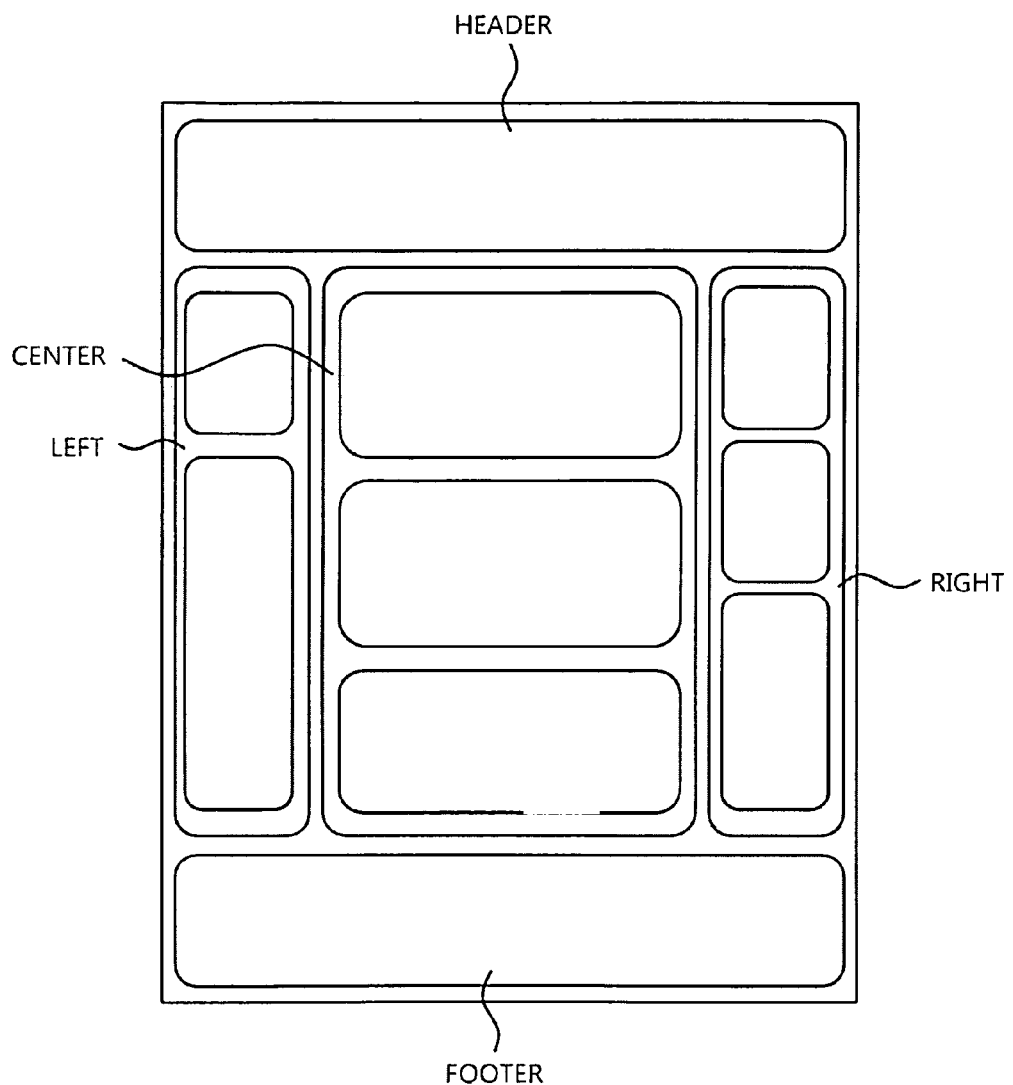
FIG. 6 is a schematic diagram showing the layout of a component according to an exemplary embodiment of the present invention.

The content format may vary according to component. That is, the content format of a first component may include hyperlinks, a media format such as text, images and videos, and an interactive method such as buttons, text input windows, lists, radio buttons and check boxes. The content format of a second component may include a plurality of first components having the equal importance. The content format of a third component may refer to content type. That is, the content format of the third component may include a document composed of main contents, such as news and a blog, and a document composed of menus and hyperlinks, such as a first page of a portal site. From among various examples of the layout of a component described above, an example of the arrangement of components, that is, header, left, center, right and footer, is shown in FIG. 6.

The document tree creating unit 111 may calculate the priority of each component with reference to attributes of each component, a user's profile stored in the user profile storing unit 120, and attributes of a display device stored in the device attribute storing unit 130. The calculated priorities may be used as parameters when the document converting unit 140 changes the layout of each component. The calculated priorities may also be used when it is determined whether to display all of a plurality of first components included in a specified second component by adjusting the length of summary information of each of the first components, display those of the first components which have high priorities, display only part of those first components which are in the same form, or use a combination of the above methods.

The summary information creating unit 112 may create various lengths of summary information, so that the amount of contents, such as text and images, which correspond to each component to be represented in a document, can be adjusted. In addition, the summary information creating unit 112 may add the created summary information to each node of the document tree described above. In this case, the length of summary information may be understood as the length of text or the size of an image.

The summary information may be created by the summary information creating unit 112 in advance, and the document converting unit 140, which will be described later, may extract summary information of an appropriate length from the created summary information and use the extracted summary information. Alternatively, when the document converting unit 140 converts a document, the summary information creating unit 112 may determine the amount of contents, which are to be displayed, based on the size of a region in which each component is displayed and create summary information of an appropriate length in real time. However, the present invention is not limited thereto.

Summary information created by the summary information creating unit 112 may be classified by media type as follows. In the case of text, summary information created by the summary information creating unit 112 may include a keyword, a group of keywords, a key sentence, and a summary sentence which are classified by length. Here, the length of the summary information may be increased in order of "keyword<group of keywords<key sentence."

The summary information of an image may be created by extracting part of the image, resizing the image, or using alt information, such as <ing src=" . . . " alt" . . . ">, or uniform resource locator (url) information of text which corresponds to the image. That is, in the case of an image, only part of the image may be displayed, or the url information of the image may be displayed as summary information. In the case of a movie, the movie may be resized, or text may be created based on information regarding the movie to produce summary information. In addition, summary information of a linked address may not be a summary of the linked address, but of contents available at the linked address. That is, when contents available at a linked address are text, summary information of the text may be created instead of summary information of the linked address.

The document converting unit 140 may include a document style converting unit 141 and a layout converting unit 142. The document style converting unit 141 converts the presentation style of a document according to attributes of a display device in order to improve the readability of the document. The layout converting unit 142 may adjust the size of a display region of each component and the amount of contents corresponding to each component according to attributes of a display device, a user profile, a focused component, and a zoom ratio.

Specifically, the document style converting unit 141 may convert the presentation style of a document according to attributes and importance of each component and attributes of a display device in order to improve a user's readability of the document.

For example, when a display device, which is to display a document, is a TV, the font of the document may be converted into a san-serif or vector font, and the font size of the document may be converted within the range that guarantees the readability of the document and according to the size of a display region of each component and the amount of contents corresponding to each component. That is, the font size may be determined by "f (component weight)×(the size of the display region of a component/amount of contents))." While a case where the display device is a TV has been described above as an example to promote the understanding of the present invention, the present invention is not limited thereto. That is, the display device can be any device which can display a document, such as a portable multimedia player (PMP), a ultra-mobile personal computer (UMPC) or a mobile phone, and the font and font size of a document can be converted according to a display device within the range that guarantees the readability of the document.

The document style converting unit 141 may provide a greater amount of contents than the amount appropriate for a region of a predetermined size, in which a component is displayed, or additionally use transition or animation effects in order to draw a user's attention.

The layout converting unit 142 may convert the layout of a document, such as the size of a display region of each component included in the document and the amount of contents corresponding to each component, for example, when a document is displayed for the first time on a display device or when a user enlarges a specified component included in the document. In the present embodiment, after the layout converting unit 142 converts the layout of a document, all components of the document are simultaneously shown on one screen while the existing layout of the document is maintained. Consequently, even when a document is displayed on various display devices having screens of different sizes, a user can view all contents of the document simultaneously without scrolling through the document in horizontal and vertical directions.

Specifically, when a document is displayed on a display device for the first time, all components of the document must be displayed. Thus, the size of a display region of each component and the amount of contents corresponding to each component may be adjusted according to the layout of each component, and summary information of an appropriate length may be extracted from summary information created by the summary information creating unit 112 in order to convert the document. Here, the layout converting unit 142 may extract summary information created, in advance, by the summary information creating unit 112. Alternatively, when the layout converting unit 142 adjusts the size of the display region of each component and the amount of contents corresponding to each component, the summary information creating unit 112 may create summary information of an appropriate length in real time according to the adjusted amount of contents.

When a user enlarges a specified component in a document displayed on a display device, a maximum size to which a display region of the specified component can be enlarged under a condition in which all components of the document are displayed, that is, the maximum enlargeable size of the display region, is determined, and the amount of contents to be displayed in the display region may be determined accordingly.

Figure 7:
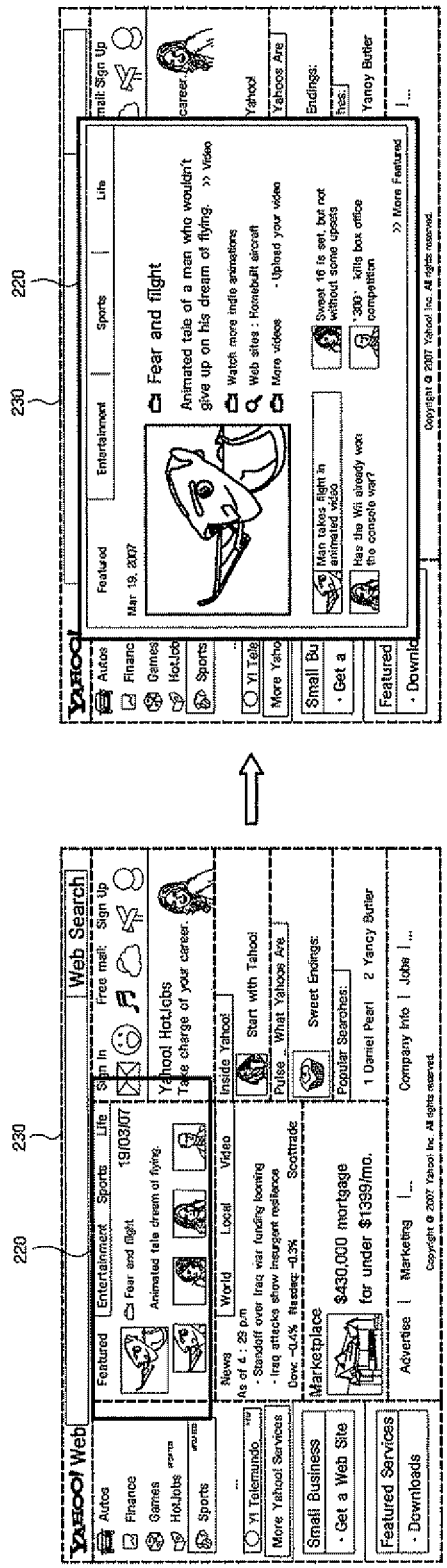
FIG. 7 is a schematic diagram for explaining a component enlarging method according to a first exemplary embodiment of the present invention.
Figure 8:
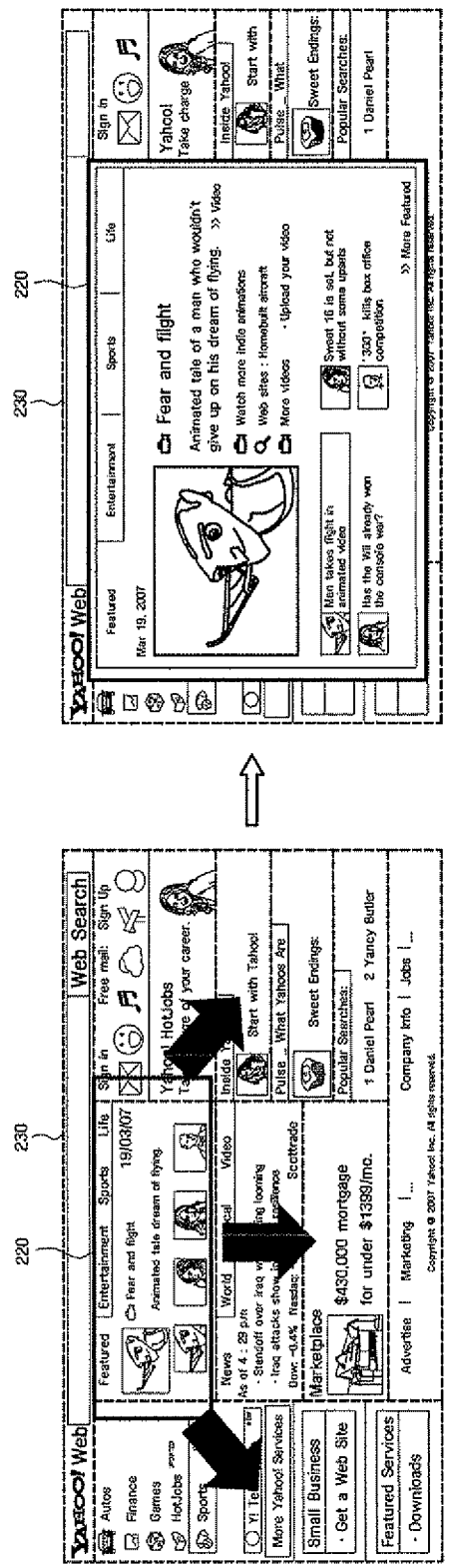
FIG. 8 is a schematic diagram for explaining a component enlarging method according to a second exemplary embodiment of the present invention.
Figure 9:
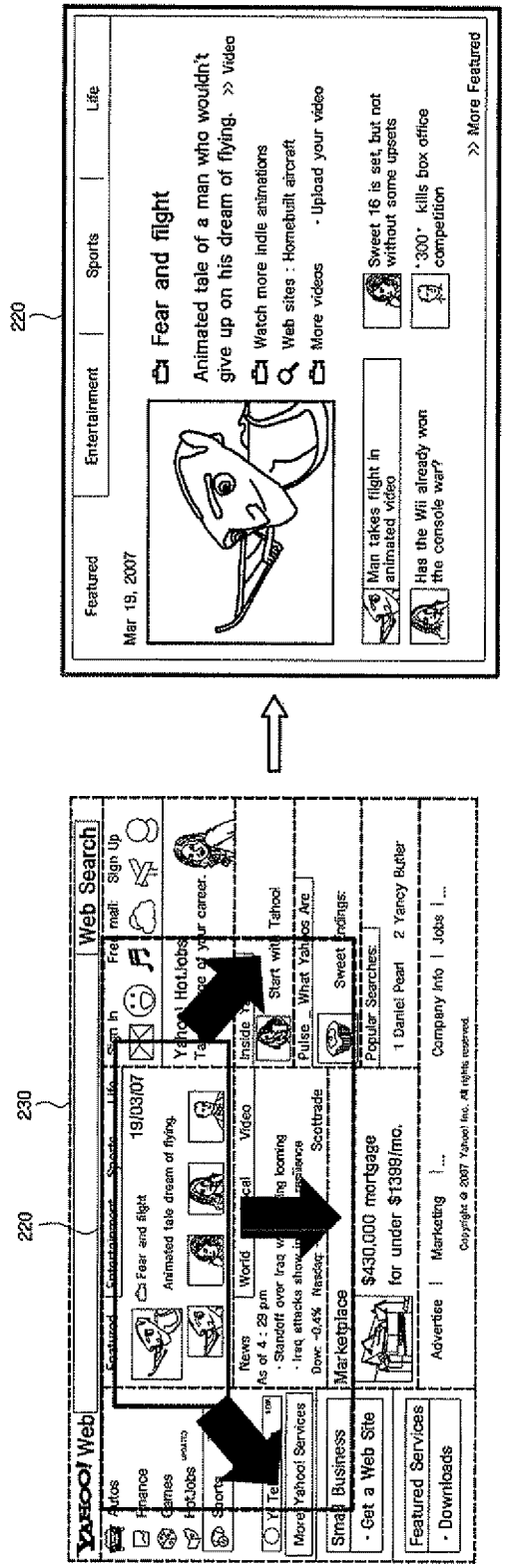
FIG. 9 is a schematic diagram for explaining a component enlarging method according to a third exemplary embodiment of the present invention.

A case where the layout converting unit 142 adjusts the layout of each component and the amount of contents corresponding to each component according to a zoom ratio of the component will now be described with reference to FIGS. 7 through 9. FIGS. 7 through 9 shows a case where a user enlarges a second component 220.

Referring to FIG. 7, when a component, which is selected by a user in a document, usually the second component 220, is enlarged, the document is overlaid with the enlarged second component 220. In this case, the existing layout of the document remains unchanged. That is, while the size of a display region of the enlarged second component 220 and the amount of contents corresponding to the enlarged second component 220 are changed, the layouts of other components remain unchanged.

If the second component 220 selected by the user is enlarged in directions indicated by arrows as shown in FIG. 8, as the size of the display region of the enlarged second component 220 is increased, the amount of contents displayed corresponding to the enlarged second component 220 also increases. Accordingly, as the sizes of display regions of other components are reduced, the amounts of contents displayed corresponding to the components are also reduced. As a result, any of the components of the document can be accessed. For example, a first component, which was previously displayed as an icon and text, may now be displayed as the icon only. The length of summary information created by the summary information creating unit 112 may also be changed according to an increase or decrease in the amount of contents corresponding to a component?).

The methods described above with reference to FIGS. 7 and 8 may also be combined. That is, the method of FIG. 8 may be used until an enlargement rate used does not exceed a reference enlargement rate. When the enlargement rate used exceeds the reference enlargement rate, the method of FIG. 7 may be used. That is, referring to FIG. 9, when the reference enlargement rate is 60%, if the second component 220 is enlarged up to 60%, the method of FIG. 8 may be used. That is, the size of the display region of the enlarged second component 220 and the amount of contents corresponding to the enlarged second component 220 may be increased while the sizes of display regions of other components and the amounts of contents displayed corresponding to the components are reduced. If the second component 220 is enlarged to more than 60%, the overlaying method of FIG. 7 may be used.

FIG. 10 is a flowchart illustrating an adaptive document displaying method according to an exemplary embodiment of the present invention. In FIG. 10, it is assumed that the summary information creating unit 112 creates various lengths of summary information of each component in advance and that the layout converting unit 142 extracts summary information of an appropriate size from the created summary information and uses the extracted summary information. However, the summary information creating unit 112 can also create summary information in real time when the layout converting unit 142 converts a document. In this case, the process of creating summary information may be the same as the process performed to create the summary information in advance although the timing of the creation of the summary information is different.

Referring to FIG. 10, the document tree creating unit 111 analyzes a document created not for the type of display devices used in the present invention, but for other types of display devices and creates a basic tree (operation S110). That is, in the present embodiment, the document tree creating unit 111 analyzes a document written for PCs and creates a basic tree in order to display the document on a TV.

The document tree creating unit 111 creates a document tree composed of first through third components based on the created basic tree (operation S120). Here, each of the first through third components may correspond to a node of the document tree created by the document tree creating unit 111, and the relationships between the first through third components included in a document may be represented in the document tree. In addition, the document tree creating unit 111 assigns attributes of each component to a corresponding node of the created document tree and calculates the priority of each component.

The summary information creating unit 112 creates various lengths of summary information of each component which corresponds to a node of the created document tree (operation S130). The summary information may be stored in a predetermined storage medium.

The document style converting unit 141 converts the presentation style of the document according to the attributes and importance of each component included in the document and attributes of a display device in order to improve a user's readability of the document (operation S140). For example, the document style converting unit 141 may convert the presentation style of the document, such as font size, font, color and arrangement of colors, in order to improve the readability of the document. When necessary, the document style converting unit 141 may provide a greater amount of contents in a region of a predetermined size, in which a specified component is displayed, or add transition or animation effects in order to draw the user's attention.

The layout converting unit 142 converts the layout of the document, that is, the size of the display region of each component included in the document and the amount of contents displayed in the display region of each component, according to the user's profile, the attributes of the display device, and a zoom rate (operation S150). Specifically, the layout converting unit 142 may change the size of the display region of each component and adjust the length of summary information of contents corresponding to each component, so that the user can view all components of the document without hardly scrolling through the document in horizontal and vertical directions. Here, the layout converting unit 142 may extract summary information of a length appropriate for each component of the converted document from various lengths of summary information created by the summary information creating unit 112.

Alternatively, the summary information creating unit 112 may not create the summary information in advance. Instead, when the layout converting unit 142 converts the document, the summary information creating unit 112 may create the summary information of an appropriate length in real time.

As described above, if a document is converted according to a user's profile and attributes of a display device and displayed accordingly, the user can view all contents of the document without scrolling through the document in horizontal and vertical directions. Thus, the screen size of the display device does not matter. In addition, the readability of the document can be improved.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An adaptive document displaying apparatus comprising:
a summary information creating unit to create various lengths of summary information for a first component of a plurality of components included in a document to adjust an amount of contents of the document to be displayed on a display device, the various lengths of summary information being provided to be displayed on the display device replacing the first component so one length of information among the various lengths of summary information is displayed instead of the first component;
a document tree creating unit to analyze each of the plurality of components included in the document and to calculate a priority for each of the plurality of components based on attributes of each respective component, a user's profile, and attributes of the display device; and
a document converting unit to convert the document into another document, which includes the one length of summary information and does not include the first component, to be displayed on the display device,
wherein the one length of summary information is selected among the various lengths of summary information using the calculated priority of the first component and the attributes of the display device,
wherein at least one of the summary information creating unit and the document converting unit use one or more processors to create the various lengths of summary information or to convert the document.

2. The adaptive document displaying apparatus as claimed in claim 1, wherein the attribute of the display device includes at least one of a size and a shape of a display screen of the display device.

3. The adaptive document displaying apparatus as claimed in claim 1, wherein the lengths of summary information includes at least one of length of text and size of image.

4. The adaptive document displaying apparatus as claimed in claim 1, wherein, when the document converting unit converts a document, the summary information creating unit determines the amount of contents, which are to be displayed, based on the size of a region in which each component is displayed and creates summary information of an appropriate length in real time.

5. The adaptive document displaying apparatus as claimed in claim 1, wherein the document converting unit comprises:
a layout converting unit to convert a layout of the document,
wherein when the document is displayed on the display device for a first time, all components of the document are displayed on the display device, and
the layout converting unit converts the layout by adjusting a size of a display region of each component and by adjusting an amount of contents corresponding to each component, to simultaneously display all components of the document on the display device and maintain an existing layout of the document.

6. An adaptive document displaying apparatus comprising:
a document analyzing unit to analyze, using one or more processors, each of a plurality of components included in a document;
a document converting unit to convert the document based on a result of analysis and the attribute of the displaying apparatus, and
wherein the document analyzing unit includes a document tree creating unit to calculate a priority for each of the plurality of components based on attributes of each respective component, a user's profile, and an attribute of the displaying apparatus, and
the document converting unit changes an amount of content of each component and a size of a display region of each component based on the result of the analysis using the calculated priority of each component and the attribute of the displaying apparatus,
wherein the document analyzing unit further includes a summary information creating unit to create summary information of each component, and a length of summary information is selected for a first component among the plurality of components using a calculated priority of the first component and the attribute of the displaying apparatus.

7. The adaptive document displaying apparatus as claimed in claim 6, wherein the attribute of the displaying apparatus includes at least one of a size and a shape of a display screen of the displaying apparatus.

8. The adaptive document displaying apparatus as claimed in claim 6, wherein the document tree creating unit creates a document tree which represents hierarchical relationships between the components and comprises a plurality of nodes corresponding to the components, respectively.

9. The adaptive document displaying apparatus as claimed in claim 6, wherein the document converting unit comprises:
a document style converting unit to convert presentation style of each component according to the attributes of the display device; and
a layout converting unit to convert a size of a display region of each component and to convert the amount of contents, which are to be displayed in the display region of the component, according to the size of the display region of the component,
wherein the presentation style of each component comprises at least one of font, font size, color and arrangement of colors of contents contained in each component.

10. An adaptive document displaying apparatus comprising:
a document analyzing unit to analyze, using one or more processors, each of a plurality of components included in a document;
a document converting unit to convert the document based on a result of analysis and the attribute of the displaying apparatus, and
wherein the document analyzing unit includes a document tree creating unit to calculate a priority for each of the plurality of components based on attributes of each respective component, a user's profile, and an attribute of the displaying apparatus, and
the document converting unit changes an amount of content of each component and a size of a display region of each component based on the result of the analysis using the calculated priority of each component and the attribute of the displaying apparatus,
wherein the document converting unit comprises:
a layout converting unit to convert a layout of the document,
wherein when the document is displayed on the display device for a first time, all components of the document are displayed on the display device, and
the layout converting unit converts the layout by adjusting a size of a display region of each component and by adjusting an amount of contents corresponding to each component, to simultaneously display all components of the document on the display device and maintain an existing layout of the document.

* * * * *